United States Patent [19]

Tack

[11] Patent Number: 5,597,529
[45] Date of Patent: Jan. 28, 1997

[54] ALUMINUM-SCANDIUM ALLOYS

[75] Inventor: William T. Tack, Castle Rock, Colo.

[73] Assignee: Ashurst Technology Corporation (Ireland Limited), County Clare, Ireland

[21] Appl. No.: 335,488

[22] Filed: Nov. 7, 1994

Related U.S. Application Data

[62] Division of Ser. No. 249,023, May 25, 1994, abandoned.

[51] Int. Cl.$^6$ .......................... C22C 21/12; C22C 21/02; C22C 21/08
[52] U.S. Cl. .......................... 420/532; 420/544; 420/529; 420/548
[58] Field of Search .......................... 420/529, 532–535, 420/537, 544, 548

[56] References Cited

U.S. PATENT DOCUMENTS

| | | | |
|---|---|---|---|
| 2,806,128 | 9/1957 | Muller | 219/146 |
| 3,104,252 | 9/1963 | Radd et al. | 260/448 |
| 3,326,820 | 6/1967 | Cuomo et al. | 252/478 |
| 3,382,269 | 5/1968 | Williams et al. | 260/448 |
| 3,395,001 | 7/1968 | Stroup et al. | 29/197.5 |
| 3,440,712 | 4/1969 | Stroup et al. | 29/494 |
| 3,619,181 | 11/1971 | Willey | 75/138 |
| 4,082,573 | 4/1978 | Schoerner et al. | 148/2 |
| 4,126,242 | 11/1978 | Yajima et al. | 220/83 |
| 4,689,090 | 8/1987 | Sawtell et al. | 148/2 |
| 4,902,654 | 2/1990 | Aubert et al. | 501/117 |
| 4,929,511 | 5/1990 | Bye, Jr. et al. | 428/606 |
| 4,950,560 | 8/1990 | Tarcy | 429/27 |
| 4,962,504 | 10/1990 | Aubert et al. | 372/41 |
| 5,037,608 | 8/1991 | Tarcy et al. | 420/528 |
| 5,055,255 | 10/1991 | Scott et al. | 420/534 |
| 5,055,257 | 10/1991 | Chakrabarti et al. | 420/902 |
| 5,059,390 | 10/1991 | Burleigh et al. | 420/405 |
| 5,066,342 | 11/1991 | Rioja et al. | 148/12.7 A |
| 5,076,340 | 12/1991 | Bruski et al. | 164/97 |
| 5,133,931 | 7/1992 | Cho | 420/541 |
| 5,198,045 | 3/1993 | Cho et al. | 148/552 |
| 5,211,910 | 5/1993 | Pickens et al. | 420/532 |

OTHER PUBLICATIONS

Fridlyander, et al., "Soviet Al–Li Alloys of Aerospace Application," *Papers presented at the Sixth International Aluminum—Lithium Conference*, vol. 1 (1991), pp. 35–42.

Fridlyander, et al., "Structure and Properties of Al–Li Alloys. Alloyed With Scandium," *Papers presented at the Sixth International Aluminum—Lithium Conference*, vol. 1, (1991), pp. 381–386.

Fridlyander, et al., "High–Strength Weldable 1460 Alloy for Cryogenic Application," *Papers presented at the Sixth International Aluminum—Lithium Conference*, vol. 1 (1991), pp. 1245–1250.

Kaygorodova, et al., "The Effect of Small Sc and Mg Addition on Al–Li–Cu–Zr Alloy Structure and Mechanical Properties," *Papers presented at the Sixth International Alumium—Lithium Conference*, vol. 1 (1991), pp. 363–367.

Fridlyander, et al., "The Effect of Scandium on Decomposition Kinetics in Aluminium–Lithium Alloys," *Papers presented at the Sixth International Aluminum—Lithium Conference*, vol. 1, (1991), pp. 107–112.

Fridlyander, et al., "Fatigue Strength of Al–Cu–Li Alloy at Temperature 293–4 K," *Papers presented at the Sixth International Alluminum–Lithium Conference*, vol. 1, (1991), pp. 615–620.

Fridlyander, et al., "The Peculiarities of Grain Structure of Aluminium–Lithium Alloys," *Papers presented at the Sixth International Aluminum—Lithium Conference*, vol. 1 (1991), pp. 867–871.

Kolobnev, et al., "Superplasticity of Al–Mg–Li System Alloys," *Papers presented at the Sixth International Aluminum–Lithium Conference*, vol. 1 (1991), pp. 1053–1056.

Tsenev, et al., "Mechanical Properties of Submicron Grained Al–Li Alloys," *Papers presented at the Sixth International Aluminum—Lithium Conference*, vol. 1 (1991), pp. 1125–1132.

Dutkiewicz, et al., "Effect of Scandium on the Decomposition of Aluminium–Zinc Alloys," *Journal of Materials Science*, 27 (1993) pp. 3032–3035.

Blake, et al., "Constitution and Age Hardening of Al–Sc Alloys," *Journal of Materials Science*, 20 (1985), pp. 2861–2867.

*Primary Examiner*—Deborah Yee
*Attorney, Agent, or Firm*—Sheridan Ross & McIntosh

[57] ABSTRACT

A method for assembling a structure using a filler alloy which includes aluminum and scandium. The method generally includes selecting parts for the structure which are formed from aluminum and/or an aluminum alloy and welding the same together with the aluminum-scandium filler alloy. Similar to the filler alloy, the parts may also include scandium. In one embodiment, the filler alloy and/or the parts further include zirconium. A method for assembling a bicycle frame is also provided. The method includes the steps of forming a first tube, at least a portion of which comprises scandium, forming a second tube, at least a portion of which comprises scandium, and joining the first and second tubes together. A number of aluminum-based alloys are also disclosed which possess enhanced properties. The alloys include scandium in combination with other alloying elements such as, for example, zirconium, copper, magnesium and silicon.

21 Claims, No Drawings

ALUMINUM-SCANDIUM ALLOYS

This is a divisional of application Ser. No. 08/249,023, filed May 25, 1994, now abandoned.

FIELD OF THE INVENTION

The present invention relates generally to alumina-based alloys and, more particularly, to alumina-based alloys comprising scandium in combination with other alloying elements to enhance various characteristics of the alloy, especially when utilized as a base or filler alloy in a welding application.

BACKGROUND OF THE INVENTION

The weldability of aluminum alloys (i.e., the base alloy or material) can be defined as the alloy's resistance to hot tearing during weld solidification. The primary factors that render aluminum alloys more susceptible to developing hot tears during welding relative to other metallic alloy systems are the relatively high thermal expansion coefficient and solidification shrinkage of aluminum. These factors are further compounded when one or more alloying elements are added to aluminum to achieve technologically useful engineering alloys with improved properties (e.g., strength and elongation). More specifically, unlike pure aluminum, which has a definite melting temperature, two-component or multi-component aluminum alloys solidify over a wide temperature interval between the liquidus and solidus temperatures. A large solidification range allows more time for the deleterious thermal expansion and volumetric changes to generate sufficient stresses that ultimately cause tearing of the liquid films that partition to interdendritic sites.

Many high strength aluminum alloys have been developed and are generally categorized according to the primary alloying addition (e.g., Al-Cu:2XXX; Al-Mg:5XXX; Al-Si:6XXX; and Al -Zn:7XXX). Since there is a single primary alloying element, these alloys are commonly referred to as binary systems. However, certain ancillary alloying additions are often included to produce a wide range of alloys that are targeted for several end use applications. It is standard practice, for example, to add grain refining elements, such as Ti, Zr, Cr, Mn, V, Yt, Nb, B, $TiB_2$ and Hf, to further improve the processing characteristics and properties of these alloy systems. Due to the enhanced properties of these types of alloys, it would be desirable to use these types of alloys in structures which are preferably assembled via welding.

The weldability of high strength aluminum alloys is dependent at least in part on the amount of the alloying elements in the base material. The general behavior of binary alloy systems in welding applications can be divided into three categories: very low alloying levels, high alloying levels approaching the solid solubility limit in aluminum, and intermediate alloying levels. At very low alloying levels approaching pure aluminum, cracking during solidification is very low since dendrites tend to interlock with virtually formation of an interdendritic liquid film. At high alloying levels, relatively low cracking is also observed. Even though there is a relatively large solidification range with the formation of interdendritic liquid films, any hot tearing that occurs during solidification is healed by the backfilling of the last-to-solidify eutectic liquid. This is particularly evident in the binary alloys that form eutectic phases (e.g., Cu, Mg and Si). It is the intermediate alloy levels that are most susceptible to hot tearing. Although a eutectic liquid film partitions into interdendritic sites, the thermal contraction of the dendrites induces sufficient strain to tear these liquid films, thereby resulting in the presence of cracks in the solidified weldment. In contrast to the highly alloyed binary alloys, there is an insufficient amount of eutectic liquid available to mend hot tears. An exception to these trends was reported for Zn additions. Since there is no eutectic phase in the Al-Zn system, hot tearing susceptibility continuously increases as Zn content is increased.

In addition to the amount of alloying element having an effect on weldability of binary systems, the type of ternary alloying elements plays a key role in affecting weldability. For instance, many strength-increasing additions to binary alloy systems have deleterious effects on weldability. For example, small additions of Mg to Al-Cu (i.e., 2XXX alloys) significantly improves the alloy strength. One example, alloy 2024 (Al-4.3 Cu-1.5 Mg-0.60 Mn) is widely used in aircraft construction. Since the Mg additions greatly increase the melting range, however, weldability is severely compromised. Consequently, alloy 2024 is typically not used in welded structures. The highest strength alloys are the Al-Zn-Mg (i.e., 7XXX system), particularly those with Cu additions. The additions of Cu can increase the solidification range by as much as 100° C., generally resulting in poor weldability. Thus, despite the promising properties of these alloys, they are rarely used in situations which require adequate weldability.

Given the current limitations with regard to the use of the high strength aluminum alloys in welded structures, it would be highly desirable to redesign these alloys to enhance weldability while either maintaining or increasing mechanical properties, such as strength and elongation.

Another important component in welding aluminum alloys is the filler wire. With most welding processes, an initial penetration pass with the welding torch causes displacement of the molten metal into the opposite side of the plate. It is necessary to compensate for this displacement by continuous feeding of a filler alloy into the weldment either during the initial penetration pass or in a number of subsequent multiple passes. The resulting weldment is then a mixture of the original base alloy and the filler alloy with the ratio of the filler alloy and base alloy mixture being dependent upon the joint geometry. For example, a "V-joint" geometry is typically employed when welding relatively thick aluminum plate and contains a proportionally high amount of filler alloy (e.g., 70%–90%). At the other end of the spectrum is the butt joint geometry that is used for relatively thin gauge weldments, resulting in a relatively low filler alloy content (e.g., 10%–30%).

Modern references to weldability indicate that filler alloy selection can greatly influence hot tearing resistance, particularly at high dilution levels (i.e., high filler alloy content). By examining a listing of aluminum filler alloy compositions, it can be observed that most filler alloys contain a high level of one solute (e.g., Cu, Si, or Mg) and grain refining elements (e.g., Mn, Cr, Ti, Zr, V, Yt, Nb, B, $TiB_2$ and Hf). Since these alloys are designed only for welding purposes, it is typically a filler alloy design constraint that only one major alloying addition can be made to minimize the solidification range. Accordingly, filler alloys rarely obtain the properties of complex wrought aluminum alloys such as 2024, 7075 and 6061. Further when a filler alloy is deposited, the weld microstructure is similar to the lowest strength, as-cast condition, further resulting in low strength properties. The combination of limiting filler alloy compositions to one primary alloying addition and the fact that strength properties are in accordance with the as-cast condition results in weldment yield strength properties that are as low as one-third that of the base alloy. Accordingly, a design that involves a welded plate is often three times thicker than the non-welded portions of the structure, resulting in a severe weight penalty. In weight-critical aerospace structures, this design constraint is overcome by using a thick plate in the areas to be welded and chemically milling the remaining areas. This approach can somewhat alleviate the weight penalty, but can create other problems such as additional material cost, added processing cost, and adverse effects on the environment by converting the majority of the aluminum plate to toxic chemical waste.

It would be highly desirable to offer designers of welded structures an improved approach for fabricating aluminum structures. Such approach could involve modifications to both the aluminum base alloy and the aluminum filler alloy.

SUMMARY OF THE INVENTION

The present invention generally relates to aluminum alloys which contain scandium. More specifically, the present invention includes a number of methods relating to the assembly of structures using scandium-containing aluminum alloys, as well as a number of novel compositions of scandium-containing aluminum alloys.

In one aspect, the present invention is a method for assembling a structure using a filler alloy which includes aluminum and scandium. More specifically, the method includes selecting parts for the structure which are formed from aluminum and/or an aluminum alloy and welding the same together with the aluminum-scandium filler alloy. Preferably, the aluminum-scandium filler alloy is substantially free of lithium and/or the aluminum-scandium filler alloy also includes zirconium. Moreover, preferably, the parts of the structure welded together with the noted aluminum-scandium filler alloy also include scandium, and preferably have a similar scandium content as the aluminum-scandium filler alloy. It should be noted that these aluminum-scandium filler alloys may also be used for weld repair, wherein an existing weld is subjected to a grinding operation and then rewelded with one of the noted aluminum-scandium filler alloys.

In another aspect, the present invention relates to a bike frame structure which utilizes a scandium-containing, preferably aluminum, alloy. For instance, the bike frame may be assembled by a method which includes forming at least the adjacent ends of two tubes, and preferably all of two tubes, from a scandium-containing alloy. These ends may be placed in abutting engagement and joined, such as by welding the tubes together with the above-noted types of aluminum-scandium filler alloys.

In one embodiment, the compositions of the welded parts and/or the filler alloys comprise from about 0.02 to about 10.0, and preferably from about 0.1 to about 0.5, weight percent scandium. Moreover, and as noted, the compositions of the welded parts and/or the filler alloy may further comprise zirconium, for example, in an amount ranging from about 0.01 to about 1.0, and preferably from about 0.05 to about 0.22, weight percent. When zirconium is present, the weight ratio of the scandium to the zirconium in the compositions of the welded parts and/or the filler alloy may range from about 1000:1 to about 0.02:1 and is preferably about 3:1. Moreover, scandium and zirconium may be the only grain refiners for the aluminum-scandium filler alloy.

In another aspect, the present invention is directed to a number of aluminum-based alloys which possess enhanced properties (e.g., weldability, strength and/or elongation). In addition to aluminum, the alloys each comprise a specific amount (i.e., a range) of scandium in combination with specific amounts (i.e., ranges) of other alloying elements. For example, alloys having enhanced weldability characteristics have been developed by adding scandium in combination with zirconium and other grain refiners. Other alloying elements may include scandium in combination with designated amounts of copper, magnesium or silicon.

DETAILED DESCRIPTION

In one embodiment, the present invention is a method for assembling a structure which includes at least first and second parts. The method generally comprises the steps of selecting compositions for the first and second parts, the compositions comprising at least about 60 weight percent aluminum, selecting a filler alloy comprising scandium and at least about 60 weight percent aluminum, and welding the first and second parts utilizing the filler alloy.

The welding step may be performed utilizing any appropriate welding operation. For example, welding of aluminum alloys may be performed utilizing tungsten-inert gas welding, metal inert gas welding, plasma arc welding, laser-beam welding, electron beam welding, diffusion welding, friction welding, ultrasonic welding, explosion welding, or any other appropriate welding operation. The above-noted method is particularly useful for welding an abutting joint between the first and second parts. In this regard, the welding step may comprise positioning the first and second parts in an abutting joint geometry, such as a butt joint, a V-shaped joint or a double V-shaped joint. The first part may subsequently be welded to the second part to form a welded abutting joint.

The selection of the particular filler alloy composition may have an effect on the degree of weld performance and/or may be dictated or controlled by the composition of the base material. However, generally the filler alloy composition includes from about 0.02 to about 10.0, and preferably from about 0.1 to about 0.5, weight percent scandium. In a preferred embodiment, the filler alloy composition includes about 0.40 weight percent scandium. Zirconium may also be present in the filler alloy composition, preferably in the amount of from about 0.01 to about 1.0, and more preferably 0.05 to about 0.22, weight percent. In one embodiment, the filler alloy composition comprises about 0.15 weight percent zirconium. Enhanced performance of the filler alloy may be realized by utilizing specific ratios of scandium and zirconium. For instance, in one embodiment the weight ratio of the amount of scandium to the amount of zirconium in the filler alloy composition preferably ranges from about 1000:1 to about 0.02:1, more preferably, about 3:1. In fact, in one embodiment, the filler alloy may utilize only scandium and zirconium as the grain refiners.

In addition to the foregoing, it is generally desirable for the noted filler alloy composition to be substantially free of lithium. Specific filler alloy compositions which conform to the foregoing include: Al-6.0Cu-0.5Sc-0.2Zr; Al-5.0Mg-0.5Sc-0.15Zr; and Al-5.3Si-0.5Sc.

Similar to the noted aluminum-scandium filler alloy, it may be desirable to include scandium in the base metal compositions. In this regard, the specific amounts of scandium in the compositions of such parts are generally in accordance with the amounts noted above with respect to the filler alloy. In general, however, the amount of scandium in a filler alloy will tend to be slightly higher than the amount of scandium in a corresponding base alloy to account for the generally poorer properties associated with welded filler alloys, as noted above. The compositions of the parts may further include zirconium in amounts commensurate with those noted above for the filler alloys. Moreover, the weight ratios of scandium to zirconium in the compositions are also commensurate with the noted weight ratios for the filler alloys.

Principles of the present invention are particularly adaptable for production of bicycles, and in one embodiment the present invention utilizes a scandium-containing, preferably aluminum, alloy in a bicycle frame structure. For instance, the present invention may be a method for assembling the bicycle frame. This method generally includes the steps of forming a first tube comprising scandium, forming a second tube comprising scandium, and joining the first and second tubes together. The scandium may be concentrated in the end portions of the tubes or, alternatively, may be evenly distributed throughout the tubes. This method may be utilized to join any of the tubes of a bicycle, including the top tube, the down tube, the head tube, the seat tube, the chain stays, and the seat stays.

The compositions of the first and second tubes may comprise scandium in amounts commensurate with those noted above for the filler alloys in the above-noted method. Further, the first and second tubes may comprise zirconium in amounts set forth above with respect to the filler alloys. Moreover, the weight ratio of the scandium to the zirconium can also be in accordance with the ranges noted above for the filler alloys.

The joining of the bicycle tubes of the noted method preferably comprises the step of welding, such that the above-identified types of filler alloy compositions may be used. When welding is utilized, the method further includes the step of selecting a filler alloy comprising scandium. The filler alloy composition is as generally set forth above in the description of the filler alloys for the method for assembling a structure.

Due to the improved properties associated with the utilization of scandium in a tubular structure, it is believed that the wall thicknesses of bicycle tubes produced according to the above-described method can be significantly reduced, at least in the welded portions. In this regard, the steps of forming first and second tubes preferably comprise forming a wall thickness in a welded portion that is 10 to 30 percent thinner than tubing used on conventional bicycles. For example, the wall thickness may be less than about 3.0 mm., preferably less than about 2.0 mm, and more preferably less than about 1.5 mm.

In addition to welding first and second parts of a structure together, principles of the present invention may be utilized for repairing a damaged or defective weld. Defective welds are typically caused by crack formation within the weld, especially in the heat-affected-zone. One technique for repairing the weld generally comprises grinding away at least a portion of the welded joint to form a ground portion and rewelding the ground portion utilizing a filler alloy comprising scandium, such as those described above. The grinding operation is typically performed utilizing an abrasive media, such as an abrasive disk, and typically grinds down to about 50% of the thickness of the structure being welded. The rewelding step may comprise any appropriate welding operation and preferably can be performed between five and ten times in the same area without the creation of additional cracks when utilizing one of the above-noted aluminum-scandium filler alloys, thereby maintaining the integrity of the welded joint and allowing multiple repairs to the same joint.

The present invention is further directed to aluminum-based alloys which are particularly useful in the above-described methods. In one embodiment, an alloy in accordance with principles of the present invention is a modification of Aluminum Association alloy 2618 which has a composition of (0.1–0.25) Si-(0.9–1.3) Fe-(1.9–2.7) Cu-(1.3–1.8) Mg-(0.9–1.2) Ni-0.1 Zn-(0.04–0.1) Ti. The alloy in accordance with this embodiment of the invention modifies 2618 by adding scandium and zirconium to obtain enhanced properties. This new alloy generally comprises about (0.1–0.25) Si-(0.5–1.7) Fe-(1.5–3.1) Cu-(1.0–1.5) Mg-(0.6–1.2) Ni-(0.04–0.1) Ti-(0.02–10.0) Sc-(0.1–1.0) Zr. In one embodiment, the scandium content more preferably ranges from about 0.1 to about 0.5, and even more preferably from about 0.2 to about 0.4, weight percent. Moreover, the zirconium content more preferably ranges from about 0.05 to about 0.22, weight percent. The weight ratio of the scandium to the zirconium preferably ranges from about 1000:1 to about 0.02:1, and more preferably is about 3:1. In another embodiment, the alloy includes about 0.1–1.5 combined weight percent of one or more grain refiners (e.g., Ti, Zr, Cr, Mn, V, Yt, Nb, B, $TiB_2$, and Hf). In its most-preferred embodiment, the alloy consists essentially of about 0.18 Si 1.1 Fe-2.3 Cu-1.6 Mg-1.0 Ni-0.40 Sc-(0.2–0.5) grain refiners, and the remainder consisting essentially of aluminum and incidental impurities.

In another embodiment, an alloy in accordance with the principles of the present invention is a modification of Aluminum Association alloy 6061 which has a composition of (0.4–0.8),Si-0.7 Fe-(0.15–0.4) Cu-0.15 Mn-(0.8–1.2) Mg -(0.04–0.35) Cr-0.25 Zn-0.15 Ti. The alloy of the present invention essentially removes chromium from the 6061 alloy and adds scandium in its place to obtain enhanced properties. This alloy generally comprises about (0.2–1.8) Si -(0.2–0.8) Mn-(0.4–1.4) Mg-(0.02–10.0) Sc, and is substantially free of chromium. In one embodiment, the scandium content more preferably ranges from about 0.1 to about 0.5, and even more preferably from about 0.2 to about 0.4, weight percent. In another embodiment, the alloy further comprises zirconium, preferably in the range of about 0.01 to about 1.0, and more preferably about 0.05 to about 0.22, weight percent. The weight ratio of the scandium to the zirconium preferably ranges from about 1000:1 to about 0.02:1, and more preferably is about 3:1. In another embodiment, the alloy includes about 0.1–1.5 combined weight percent of one or more grain refiners, not including chromium. In its most-preferred embodiment, the alloy consists essentially of about 0.6 Si-1.0 Mg-0.4 Sc-(0.2–0.5) grain refiners, and the remainder consisting essentially of aluminum and incidental impurities. Copper may also be provided in an amount of about 0.1 to 0.4 weight percent, preferably about 0.3 weight percent.

In another embodiment, an alloy in accordance with the principles of the present invention is a modification of Aluminum Association alloy 7075 which has a composition of 0.4 Si-0.5 Fe-(1.2–2.0) Cu-0.3 Mn-(2.1–2.9) Mg-(0.18 0.28) Cr-(5.1–6.1) Zn-0.2 Ti. The alloy of the present invention essentially removes chromium from the 7075 alloy and adds scandium in its place to obtain enhanced properties. This new alloy generally comprises about (4.0–9.0) Zn-(0.6–3.8) Mg-(0.1–3.0) Cu-(0.02–10.0) Sc-(0.01–1.0) Zr, and is substantially free of chromium. In one embodiment, the scandium content more preferably ranges from about 0.1 to about 0.5, and even more preferably from about 0.2 to about 0.4, weight percent. In another embodiment, the alloy further comprises zirconium, preferably, in the range of about 0.01 to about 1.0 and more preferably about 0.05 to about 0.22, weight percent. The weight ratio of the scandium to the zirconium preferably ranges from about 1000:1 to about 0.02:1, and more preferably is about 3:1. In another embodiment, the alloy includes about 0.1–1.5 combined weight percent of one or more grain refiners, not including chromium. In its most-preferred embodiment, the alloy consists essentially of about 5.6 Zn-2.5 Mg-1.6 Cu-0.40 Sc-(0.2–0.5) grain refiners, and the remainder consisting essentially of aluminum and incidental impurities.

In another embodiment, an alloy in accordance with the principles of the present invention is a modification of Aluminum Association alloy 2195 which has a composition of 4.0 Cu-0.4 Mg-1.0 Li-0.4 Ag-0.14 Zr. The alloy of the present invention takes advantage of the presence of zirconium in the 2195 alloy and adds scandium to obtain enhanced properties. This new alloy generally comprises about (3.5–5.5) Cu-(0.01–1.5) Mg-(0.4–2.0) Li-(0.01–0.8) Ag-(0.02–0.5) Sc-(0.01–1.0) Zr, and is substantially free of zinc. In one embodiment, the scandium content more preferably ranges from about 0.1 to about 0.5, and even more preferably from about 0.2 to about 0.4, weight percent. Moreover, the zirconium content more preferably ranges from about 0.05 to about 0.22, weight percent. The weight ratio of the scandium to the zirconium preferably ranges from about 1000:1 to about 0.02:1, and more preferably is about 3:1. In one embodiment, the alloy includes about 0.1–1.5 combined weight percent of one or more grain refiners. In its most-preferred embodiment, the alloy consists essentially of about 4.0 Cu-0.4 Mg-1.0 Li-0.4 Ag-0.4 Sc-(0.2–0.5) grain refiners, and the remainder consisting essentially of aluminum and incidental impurities.

In another embodiment, an alloy in accordance with the principles of the present invention is a modification of Aluminum Association alloy 2020 which has a composition of 4.5 Cu-1.1 Li-0.5 Mn-0.2 Cd. The alloy of the present invention essentially removes cadmium from the 2020 alloy and adds scandium in its place to obtain enhanced properties. This new alloy generally comprises about (3.0–6.0) Cu-(0.4–1.8) Li-(0.1–0.7) Mn-(0.02–10.0) Sc-(0.01–1.0) Zr. In one embodiment, the scandium content more preferably ranges from about 0.1 to about 0.5, and even more preferably from about 0.2 to about 0.4, weight percent. In another embodiment, the alloy further comprises zirconium, preferably in the range of about 0.01 to about 1.0, and more preferably about 0.05 to about 0.22, weight percent. The weight ratio of the scandium to the zirconium preferably ranges from about 1000:1 to about 0.02:1, and more preferably is about 3:1. In one embodiment, the alloy includes about 0.1–1.5 combined weight percent of one or more grain refiners. In its most-preferred embodiment, the alloy consists essentially of about 4.0 Cu-1.0 Li-0.4 Sc-(0.2–0.5) grain refiners, and the remainder consisting essentially of aluminum.

In another embodiment, an alloy in accordance with the principles of the present invention is particularly useful as a filler alloy and is a modification of Aluminum Association alloy 2319 which has a composition of 0.2 Si-0.3 Fe-(5.8–6.8) Cu-(0.2–0.4) Mn-0.02 Mg-0.1 Zn-(0.05–0.15) V-(0.1–0.25) Zr-(0.1–0.2) Ti. The alloy of the present invention essentially adds scandium to the 2319 alloy to obtain enhanced properties. This new alloy generally comprises about (2.0–10.0) Cu-(0.02–10.0) Sc. In one embodiment, the scandium content more preferably ranges from about 0.1 to about 0.5, and even more preferably from about 0.2 to about 0.4, weight percent. In another embodiment, this new alloy further comprises zirconium, preferably in the range of from about 0.01 to about 1.0, and more preferably from about 0.05 to about 0.22, weight percent. In yet another embodiment, the new alloy includes about 0.1–1.5 combined weight percent of one or more grain refiners. In its most-preferred embodiment, the alloy consists essentially of about 6.0 Cu-0.5 Sc-(0.2–0.8) grain refiners, and the remainder consisting essentially of aluminum and incidental impurities.

In another embodiment, an alloy in accordance with the principles of the present invention is particularly useful as a filler alloy and is a modification of Aluminum Association alloy 5356 which has a composition of 0.25 Si-0.4 Fe-0.1 Cu-(0.05–0.2) Mn-(4.5–5.5) Mg-(0.05–0.2) Cr-0.1 Zn-(0.06–0.2) Ti. The alloy of the present invention essentially adds scandium to the 5356 alloy to obtain enhanced properties. This new alloy generally comprises about (2.7–6.0) Mg-(0.02–10.0) Sc. In one embodiment, the scandium content more preferably ranges from about 0.1 to about 0.5, and even more preferably from about 0.2 to about 0.4, weight percent. In another embodiment, the alloy further comprises zirconium, preferably in the range of from about 0.01 to about 1.0, and more preferably from about 0.05 to about 0.22, weight percent. In another embodiment, the alloy further comprises titanium, preferably in the range of from about 0.01 to about 0.2, and more preferably about 0.15, weight percent. In another embodiment, the alloy comprises manganese, preferably in the range of from about 0.01 to about 0.7, weight percent. In yet another embodiment, the new alloy includes about 0.1–1.5 combined weight percent of one or more grain refiners. In its most-preferred embodiment, the alloy consists essentially of about 5.0 Mg-0.5 Sc-(0.2–0.8) grain refiners, and the remainder consisting essentially of aluminum and incidental impurities.

In another embodiment, an alloy in accordance with the principles of the present invention is directed to a novel alloy which is particularly useful as a filler alloy and is a modification of Aluminum Association alloy 4043 which has a composition of (4.5–6.0) Si-0.8 Fe-0.3 Cu-0.05 Mn-0.05 Mg-0.1 Zn-0.2 Ti. The new alloy essentially adds scandium to the 4043 alloy to obtain enhanced properties. The new alloy generally comprises about (3.0–15.0) Si-(0.02–10.0) Sc. In one embodiment, the scandium content ranges from about 0.1 to about 0.5, and preferably from about 0.2 to about 0.4, weight percent. In another embodiment, the alloy further comprises titanium, preferably in the range of from about 0.01 to about 2.0, weight percent. In yet another embodiment, the new alloy includes about 0.1–1.5 combined weight percent of one or more grain refiners. In addition, the alloy may comprise 0.01–0.8 weight percent beryllium. In its most-preferred embodiment, the alloy consists essentially of about 5.3 Mg-0.5 Sc-(0.2–0.8) grain refiners, and the remainder consisting essentially of aluminum and incidental impurities.

EXAMPLE 1

Six specimens (representing two different alloys) were tested for weldability utilizing the "Patch Test." In the Patch Test, a circular weld is produced on the surface of the alloy without utilizing filler material. After cooling, the alloy is inspected for cracks. The length of all of the cracks are added together to obtain the "Total Crack Length" ("TCL") of the alloy. The TCLs of different alloys can be compared and are typically indicative of the relative weldability of the alloys.

In the present example, the six specimens included three specimens of 6061 alloy and three specimens of a modification of the 6061 alloy ("M6061") in accordance with principles of the present invention. The compositions of the alloys are set forth in Table 1.

TABLE 1

| Alloy | Al | Si | Fe | Cu | Mn | Mg | Cr | Sc | Zr |
|---|---|---|---|---|---|---|---|---|---|
| 6061 | * | 0.618 | 0.469 | 0.272 | 0.276 | 0.979 | 0.208 | — | — |
| M6061 | * | 0.650 | 0.559 | 0.270 | 0.272 | 1.023 | 0.009 | 0.40 | 0.12 |

*balance

In the present Patch Test, the weld electrode ran a current of 80 amps and a voltage of 12 volts. The travel speed of the electrode was 10 inches/minute and the diameter of the weld was 2.0 inches. The specimens were each 0.156 inches thick.

The data generated from the foregoing Patch Test is illustrated in Table 2. As can be seen from Table 2, the TCLs of the 6061 specimens ranged from 31.8 mm to 43.4 mm stark contrast, the TCLs of the M6061 specimens were zero for all specimens. These results indicate that the replacement of chromium with scandium and zirconium dramatically improves weldability. This is an extremely surprising result, especially given the fact that alloy 6061 is historically extremely hot crack sensitive compared to other aluminum alloys.

TABLE 2

| ALLOY | TOTAL CRACK LENGTH (MM) |
|---|---|
| 6061-1 | 31.8 |
| 6061-2 | 36.6 |
| 6061-3 | 43.4 |
| M6061-1 | 0.0 |
| M6061-2 | 0.0 |
| M6061-3 | 0.0 |

EXAMPLE 2

Eight filler alloy specimens were tested for weld properties and compared to published data for 2319 filler alloy. The filler alloys were used to weld a 2014 base alloy metal, and the resulting welds were tested for Ultimate Tensile Strength ("UTS"), Yield Strength ("YS") and Elongation.

The specimens included modifications of the 2319 filler alloy in accordance with principles of the present invention. The compositions of each alloy and the test results are set forth in Table 3.

TABLE 3

| Filler Alloy Composition (weight percent) | Ultimate Tensile Strength, ksi | Yield Strength, ksi | % Elongation (in 1.5 inches) |
|---|---|---|---|
| Al—6.3 Cu—0.30 Mn—0.15 Ti—0.17 Zr—0.10 V (2319) (published) | 35.0 | 28.0 | 5.0 |
| (1) Al—5.0 Cu—0.37 Sc* | 49.6(42) | 34.5(23) | 6.7 (34) |
| (2) Al—2.60 Cu—0.16 Sc—0.19 Zr* | 48.6(39) | 34.2(22) | 5.7 (14) |
| (3) Al—5.20 Cu—0.36 Sc—0.20 Zr* | 49.1(40) | 35.2(26) | 5.4 (8) |
| (4) Al—3.08 Cu—0.17 Sc—0.19 Zr | 46.5(33) | 33.1(18) | 4.7 (−6) |
| (5) Al—5.20 Cu—0.17 Sc—0.10 Mn | 46.9(34) | 35.1(25) | 4.0(−20) |
| (6) Al—4.50 Cu—0.15 Sc—0.10 Ti | 46.7(33) | 34.8(24) | 4.0(−20) |
| (7) Al—5.10 Cu—0.15 Sc—0.03 Hf | 47.6(36) | 34.8(24) | 4.7 (−6) |
| (8) Al—2.30 Cu—0.40 Sc—0.20 Zr | 45.8(31) | 35.9(28) | 5.0 (0) |

*Failure occurred in the parent metal instead of the weldment
Number in parenthesis indicates the % improvement over 2319 filler alloy The welding operation was performed by hand at a current of 90–120 amps and a voltage of 12 volts.

As can be seen from comparing the data from specimen 1 to the published data for 2319 alloy, the removal of grain refiners (e.g., Mn, Ti, Zr and V) from 2319 and the substitution of scandium therefor resulted in a 42% increase in UTS, a 23% increase in YS, and a 34% increase in elongation. Data from specimens 2 and 3 indicate similar trends for the addition of scandium and zirconium in place of the grain refiners. It should be noted that, during the UTS test, the failures of alloys 1, 2 and 3 occurred in the parent metal instead of the weldment. Accordingly, the UTS for those welds are even higher than the values given in Table 3.

Specimens 4–7 showed improvements in UTS and YS, but showed a decrease in elongation compared to 2310 filler alloy. Specimen 8 showed increases in UTS and YS, but showed no change in elongation.

EXAMPLE 3

Eighteen aluminum alloy specimens, representing six different alloys (three specimens per alloy), were tested for Ultimate Tensile Strength ("UTS"), Yield Strength ("YS") and Elongation.

In the present example, the six alloys included: 7075, 6061, 2618, and modifications of each of these alloys in accordance with principles of the present invention (M7075, M6061 and M2618). The weight percent compositions of the specimens tested are set forth in Table 4. The averages of the UTS, YS and Elongation for the three specimens of each alloy are set forth in Table 5.

TABLE 4

| Alloy | Si | Fe | Cu | Mn | Mg | Cr | Ni | Zn | Ti | Zr | Sc |
|-------|------|-------|-------|------|-------|------|-------|-------|------|-----|-----|
| 7075  | .025 | 0.28  | 1.611 | .004 | 2.556 | .221 |       | 5.609 |      |     |     |
| M7075 | .066 | .040  | 1.575 | .004 | 2.613 | .009 |       | 5.703 |      | .11 | .40 |
| 6061  | .618 | .469  | .272  | .276 | .979  | .208 |       |       | .001 |     |     |
| M6061 | .650 | .559  | .270  | .272 | 1.023 | .009 |       |       | .001 | .12 | .40 |
| 2618  | .147 | 1.116 | 2.314 | .006 | 1.675 | .001 | 1.158 |       | .081 |     |     |
| M2618 | .222 | 1.129 | 2.349 | .005 | 1.572 | .001 | 1.327 |       | .082 | .12 | .40 |

TABLE 5

|                    | UTS  | YS   | % Elong. |
|--------------------|------|------|----------|
| 7075               | 84.4 | 74.3 | 10.7     |
| M7075              | 82.5 | 73.4 | 12.0     |
| - aged 120° C. for 18 h |      |      |          |
| 2618               | 50.2 | 57.4 | 13.0     |
| M2618              | 53.4 | 62.9 | 9.0      |
| - aged @200° C. for 20 h |      |      |        |
| 6061               | 35.1 | 30.7 | 19.0     |
| M6061              | 45.7 | 40.2 | 13.0     |

- aged @160° C. for 18 h

Referring to the data for alloys 7075 and M7075, it can be seen that the modification of alloy 7075 by removing chromium and adding scandium and zirconium resulted in a minor loss in a strength and approximately a 10% increase in Elongation. It is believed that, upon optimization of heat treatment, the UTS and YS of the M7075 alloy will outperform the 7075 alloy.

The M2618 alloy showed a slight increase in UTS and YS and a loss in Elongation compared to the 2618 alloy.

The most dramatic gains in strength were observed for the M6061 alloy. As can be seen from the data, significant gains were made in UTS and YS for the M6061 alloy compared to the 6061 alloy. Upon optimization of heat treatment, it is believed that further gains can be made.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An aluminum-based alloy comprising:
   from about 0.20 to about 1.8 weight percent silicon;
   from about 0.20 to about 0.80 weight percent manganese;
   from about 0.40 to about 1.40 weight percent magnesium;
   from about 0.01 to about 1.0 weight percent zirconium;
   from about 0.02 to about 10.0 weight percent scandium; and
   from about 60 to about 99 weight percent aluminum, wherein any presence of chromium in said alloy is as an unavoidable impurity.

2. An aluminum-based alloy, as claimed in claim 1, wherein said alloy comprises from about 0.1 to about 0.5 weight percent scandium.

3. An aluminum-based alloy, as claimed in claim 2, wherein said alloy comprises from about 0.2 to about 0.4 weight percent scandium.

4. An aluminum-based alloy, as claimed in claim 1, wherein said alloy comprises from about 0.05 to about 0.22 weight percent zirconium.

5. An aluminum-based alloy, as claimed in claim 1, wherein a weight ratio of the scandium to the zirconium in the alloy ranges from about 1000:1 to about 0.01:1.

6. An aluminum-based alloy, at claimed in claim 1, consisting essentially of:
   from about 0.20 to about 1.8 weight percent silicon;
   from about 0.40 to about 1.40 weight percent magnesium;
   from about 0.02 to about 10.0 weight percent scandium;
   from about 0.1 to about 1.5 weight percent grain refiners; and
   the remainder consisting essentially of aluminum and incidental impurities.

7. An aluminum-based alloy, at claimed in claim 6, consisting essentially of:
   about 0.60 weight percent silicon;
   about 1.0 weight percent magnesium;
   about 0.40 weight percent scandium;
   about 0.2 to about 0.5 weight percent grain refiners; and
   the remainder consisting essentially of aluminums and incidental impurities.

8. An aluminum-based alloy comprising:
   from about 4.0 to about 9.0 weight percent zinc;
   from about 0.6 to about 3.8 weight percent magnesium;
   from about 0.1 to about 3.0 weight percent copper;
   from about 0.02 to about 10.0 weight percent scandium; and
   from about 60 to about 96 weight percent aluminum, wherein any presence of chromium in said alloy is as an unavoidable impurity.

9. An aluminum-based alloy, as claimed in claim 8, wherein said alloy comprises from about 0.1 to about 0.5 weight percent scandium.

10. An aluminum-based alloy, as claimed in claim 9, wherein said alloy comprises from about 0.2 to about 0.4 weight percent scandium.

11. An aluminum-based alloy, as claimed in claim 9, wherein said alloy comprises from about 0.01 to about 1.0 weight percent zirconium.

12. An aluminum-based alloy, as claimed in claim 11, wherein said alloy comprises from about 0.05 to about 0.22 weight percent zirconium.

13. An aluminum-based alloy, as claimed in claim 11, wherein a weight ratio of the scandium to the zirconium in the alloy ranges from about 1000:1 to about 0.02:1.

14. An aluminum-based alloy, as claimed in claim 8, consisting essentially of:
    from about 4.0 to about 9.0 weight percent zinc;

from about 0.6 to about 3.8 weight percent magnesium;

from about 0.1 to about 3.0 weight percent copper;

from about 0.02 to about 10.0 weight percent scandium;

from about 0.1 to about 1.5 weight percent grain refiners; and the remainder consisting essentially of aluminum and incidental impurities.

15. An aluminum-based alloy, as claimed in claim 14, consisting essentially of:

about 5.6 weight percent zinc;

about 2.5 weight percent magnesium;

about 1.6 weight percent copper;

about 0.2 weight percent titanium;

about 0.40 weight percent scandium;

about 0.2 to about 0.5 weight percent grain refiners; and the remainder consisting essentially of aluminum and incidental impurities.

16. An aluminum-based alloy consisting of:

from about 2.0 to about 10.0 weight percent copper;

from about 0.1 to 1.5 weight percent grain refiners selected from the group consisting of hafnium and yttrium;

from about 0.02 to about 10.0 weight percent scandium; and the remainder consisting of aluminum.

17. An aluminum-based alloy, as claimed in claim 16, wherein said alloy comprises from about 0.1 to about 0.5 weight percent scandium.

18. An aluminum-based alloy, as claimed in claim 17, wherein said alloy comprises from about 0.2 to about 0.4 weight percent scandium.

19. An aluminum-based alloy, as claimed in claim 16, wherein said grain refiners comprise zirconium.

20. An aluminum-based alloy, as claimed in claim 16, wherein said grain refiners comprise titanium.

21. An aluminum-based alloy, as claimed in claim 16, consisting of:

about 6.0 weight percent copper;

about 0.5 weight percent scandium;

about 0.2 to about 0.8 weight percent grain refiners; and the remainder consisting of aluminum and incidental impurities.

* * * * *